United States Patent [19]

Dailey

[11] 4,021,168

[45] * May 3, 1977

[54] TIRE MOLD HAVING WASHERED NAILS INSERTED IN THE VENTS

[75] Inventor: Charles R. Dailey, Cuyahoga Falls, Ohio

[73] Assignee: The General Tire & Rubber Company, Akron, Ohio

[ * ] Notice: The portion of the term of this patent subsequent to Nov. 2, 1993, has been disclaimed.

[22] Filed: June 18, 1976

[21] Appl. No.: 697,643

Related U.S. Application Data

[63] Continuation-in-part of Ser. No. 657,416, Feb. 12, 1976, Pat. No. 3,989,430.

[52] U.S. Cl. ............................ 425/28 R; 425/812; 249/141

[51] Int. Cl.² ........................................ B29H 5/02

[58] Field of Search .............. 425/28 R, 28 D, 401, 425/812; 249/141, 187 R

[56] References Cited

UNITED STATES PATENTS

| | | | |
|---|---|---|---|
| 2,756,460 | 7/1956 | Heintg | 425/28 D |
| 3,804,566 | 4/1974 | Kimura et al. | 425/812 |
| 3,822,857 | 7/1974 | Tanie | 425/812 |
| 3,854,852 | 12/1974 | Carter | 425/812 |
| 3,891,363 | 6/1975 | Sievers et al. | 425/812 |

*Primary Examiner*—J. Howard Flint, Jr.

[57] ABSTRACT

Nails having one or more washers positioned between the nail head and the face of the mold are inserted into the vents of tire molds. The washered nails prevent rubber protrusion from forming in the vents during molding, but allow the escape of air.

6 Claims, 14 Drawing Figures

TIRE MOLD HAVING WASHERED NAILS INSERTED IN THE VENTS

CROSS REFERENCE TO RELATED APPLICATION

This application is a continuation-in-part of my copending application Ser. No. 657,416, filed Feb. 12, 1976, now U.S. Pat. No. 3,989,430.

BACKGROUND OF THE INVENTION

1. Field of the Invention

This invention relates to nails having one or more washers positioned under the nail heads, inserted in the air vents of tire molds.

2. Description of the Prior Art

Two basic types of tires are presently being built. Bias ply tires, the first type, are built as cylinders on tire building drums. The cylinders are placed in molds. A bladder positioned inside of the cylinder is inflated with steam to convert the cylinder to toroidal shape, force the uncured rubber of the outer surface of the tire into the mold configuration and cure the tire. The procedure employed for molding a radial tire is much the same except that the uncured tire is in the shape of a toroid having a diameter almost as large as the inner surface of the mold prior to insertion into the mold. After curing it is very difficult to remove a radial tire from a conventional two piece mold because the outer diameter of the radial tire is larger than the inner diameter, formed by the surface protrusion, of the mold. By a two piece mold is meant one having two pieces against which the outer surface of the tire is formed. A bladder expands the tire into the mold surface. A tire is normally molded lying in a horizontal plane.

The upper mold surface is lubricated with silicone to facilitate release. To remove the tire from the mold a radial tire is forced from the bottom half of the mold with considerable pressure. The radial tire releases suddenly. When the tire breaks loose some of the rubber protrusions formed in the air vents break from the tire and collect in the bottom half of the mold. The broken off rubber protrusions are hereinafter referred to as plugs. Attempts to remove the plugs with pressurized air have been effective in 90% of the cases on one line of radial tires resulting in 10% of the tires produced of that line containing cosmetic surface defects caused by plugs lying in the bottom half of the mold being molded into the sidewall of the next tire cured in the mold.

Even if the plugs formed in the mold vents do not break off, they are undesirable both in bias and radial tires. The plugs that do not break off the tire are usually removed by hand using knives. This is a waste of rubber and often results in the tires being cut in the wrong places by the knives. This trimming can result in the tire being thrown out of balance.

The trimming of the plugs from tires requires a large amount of hand labor. When dealing with rapidly spinning small tires such as a truck or automobile tire, there is the danger of the rotating tire suddenly taking on a forward motion and striking the trimmer. With a large tire such as a farm implement tire or a giant earth mover tire there is the problem of physically moving the tire for the trimmer to remove the plugs and the problem of the large tire striking the trimmer when the tire is moved and/or rotated. When tires are manufactured in segmented molds there is also the problem of the rubber plugs, formed in the vents, breaking off and getting in the complex mechanical mold mechanism. This could cause mechanical wear or early failure of the segmented mold mechanism.

British Pat. No. 922,788 discloses the use of a valve to eliminate spew or plugs so as to eliminate a subsequent finishing operation.

Other patents such as U.S. Pat. No. 3,822,857 and 3,804,566 show the use of small openings in the vents apparently to allow air to pass but little if no rubber.

SUMMARY OF THE INVENTION

It has been unexpectedly discovered that by inserting washered nails into the air vents of radial tire molds and fixing the nails in place, that the number of radial tires having surface defects due to plugs being molded into the tire surfaces was reduced to 0%. A washered nail is a nail having a washer positioned on the shank of the nail directly under the nail head. Other advantages included the elimination of the plug protrusion from tires, and the expense of removing the protrusions. The rubber normally wasted in forming the protrusions goes into the tire body. In addition, when the tire mold is cleaned having the washered nails in place, the vent holes do not plug up with the sand, grit or glass beads used to clean the mold. The washered nails would be replaced after mold cleaning in the event the air passages under the nail heads were blocked. If no blockage occurs the washered nails are left in place.

Although the present invention solves a serious problem encountered in the manufacture of radial tires, it is also quite useful in the manufacture of bias tires. The elimination of rubber plugs from the surfaces of all tires saves rubber, eliminates the trimming operation and the recited prior art problems associated with trimming. The present invention also eliminates the problem of rubber plugs formed in vents from breaking off and damaging the mechanism of segmented molds.

DESCRIPTION OF THE PREFERRED EMBODIMENTS

Each washered nail insert of the tire vents is preferably a flat-headed nail having protrusions of from 0.025 to 0.125mm under the nail head and having a flat washer under the nail head. These protrusions are inherent in the manufacture of nails. When the nails are in place in the mold the protrusions hold the under surface of the nail head far enough away from the washer in contact with the mold surface to allow air, but not rubber to pass under the nail head and exhaust. The washered nail in one the nail is held in place by bending the shank of tenail protruding from the outer surface of the mold. The washered nail can also be held in place by enlarging the portion of the shank extending from the outer surface of the mold by known procedures such as by securing a disk to the shank or flattening the shank. The shank of the washered nail can also be bent and wedged into the vent holes. The preferred method of holding the washered nail in place is by inserting the shank through the vent until the washer under the nail head strikes the inner surface of the mold, then bending the shank against the outer surface of the mold to hold the washered nail in place. This preferred method allows some play of the shank in the vent. It is estimated that the head of the nail can move from 0.025 mm to 0.125 mm in relation to the washer in contact with the inner surface of the mold.

Figure 9:
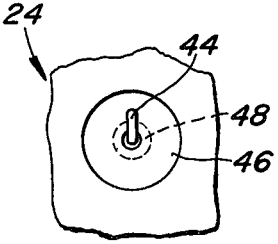
FIG. 9 is a view of a circular recess of FIG. 8.

In some instances the inner surface of the mold, such as the sidewall comes into direct contact with a support member and there is no space between the outer mold surface and the contact member to accommodate the bent over washered nail shanks. To accommodate bent over washered nail shanks in such a situation individual, preferably circular, recesses are cut into the back face of the mold. Each recess accommodates one bent over washered nail shank (see FIGS. 8 and 9). Larger areas including the entire back face of the mold behind one sidewall can be recessed except for support areas to accommodate the shanks of all the washered nails used for the entire sidewall.

Instead of a circular recess in the back surface of the mold to receive the bent over shank, a groove can be cut into the surface to receive the shank. (see FIGS. 8 and 10).

The cutting of a groove is particularly useful when a washered nail having a head designed to fit a particular mold surface design is employed. Bending the washered nail shank into the grooved recess will prevent the washered nail head having a specific non-round configuration from turning with respect to the corresponding mold surface configuration. (see FIG. 11 for a non-round washered non-round nail head, a mold surface configuration corresponding to the washered nail head configuration is not shown.)

The cutting of a groove into the exterior mold surface is also useful if the exterior and interior mold surfaces are not parallel. If the inner mold surface is at a non-parallel angle with the exterior surface, the nail head is struck with a hammer to bend it so that it lies flat and parallel with the inner mold surface (see FIGS. 1 and 8).

Figure 7:
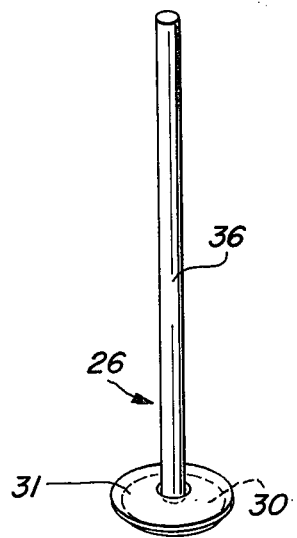
FIG. 7 is a view of one of the washered nails of FIG. 5 prior to inserting into a vent.

The preferred washered nail is shown at FIG. 7. It is an aluminum nail having a head 30, washer 31, and a shank 36 without a point. The aluminum nail is preferred because it has a smooth surface which prevents the air passage under the head from blocking as fast as a steel nail.

Figures 11, 13:
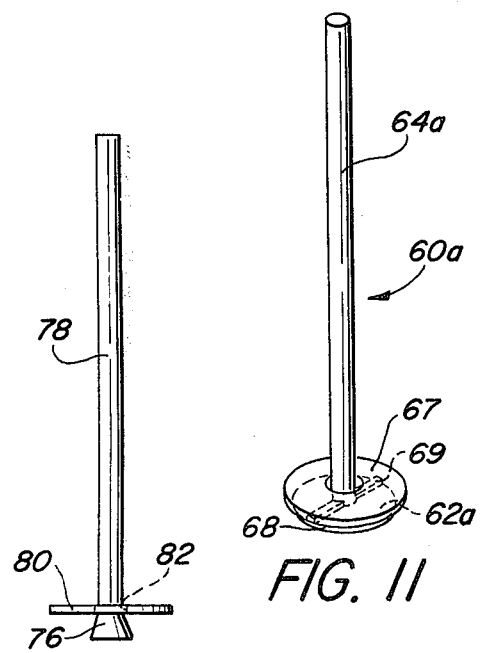
FIG. 11 is a view of a washered nail having radial ridges.
FIG. 13 is a view of a washered finishing nail.

A modification of the preferred washered nail is shown at FIG. 11. This washered nail has radial ridges 68 and 69 under the head. The washered nail including the shank 64A is made of aluminum. Washer 67 is made of stainless steel.

Figure 3:
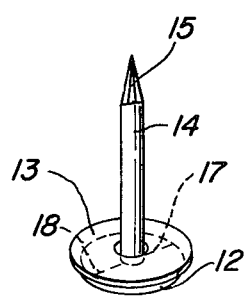
FIG. 3 is a view of a conventional nail having a washer inserted over the shank.

A conventional washered steel wire or box nail as shown in FIG. 3 can also be used as an insert in a tire mold vent. The nail has a washer 13 positioned on shank 14 a point 15 and a head 12. On the under side of the head are die marks 17 and 18.

Figure 4:
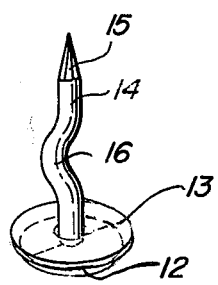
FIG. 4 is a view of the nail of FIG. 3 after it has been crimped and having a washer inserted over the shank.

The washered steel box nail before insertion into the vent is crimped as is shown in FIG. 4. The washered nail of FIG. 4 has a shank 14 having a crimp 16. The crimp is such that the nail will not fit loosely in a vent hole. It must be driven in. There is sufficient springiness in the crimped shank 14, 16 to hold the washered nail in place. Washer 13 is made of stainless steel.

Figure 12:
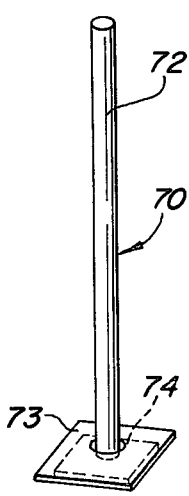
FIG. 12 is a view of a square washered square headed nail.

The washered nail 70 of FIG. 12 is exemplary of washered nails having head and washer surface configurations to match tread surface configurations of a tire mold. The nail has a square head 74, square washer 73 and a shank 72.

Figure 14:
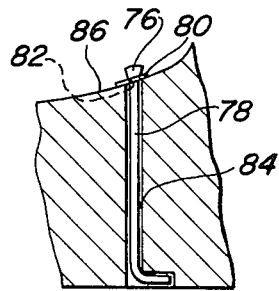
FIG. 14 is a view of a washered finishing nail inserted in a vent of a tire mold.

The washered nail of FIG. 13 is exemplary of washered small headed finishing nails. As the head 76 is not flat but an enlarged section of shank 78, washer 80 is held in place. The opening 82 in washer 80 is larger in diameter than shank 78 but smaller in diameter than head 76. FIG. 14 shows the use of the washered nail of FIG. 13 in a mold 82 in which the mold vent 84 is at a non-perpendicular angle to mold surface 86. Even with a flat headed nail the washer tends to orient parallel to the mold surface but a finishing nail allows the washer more freedom to do so.

In order that rubber from the tire being molded not adhere to the nail, it is recommended that the nail and the washer positioned under the nail head be coated with a release agent such as poly(fluoroethylene).

A tire mold often contains between 200 and 2000 vents. If it can be established that only plugs from certain vents are creating a problem, then washered nails can be inserted only in the problem vents. Sidewall vents generally do not cause a problem. It is preferred, however, that all vents have nails inserted in them.

It is preferred that the nail inserts have flat heads having a diameter of from 0.5 mm to 1.7 mm larger than the diameter of the shank. The range of outer diameters of the washers is the same as that of the nail heads and although the range is the same, the washers used in a particular nail need not have the same diameter as the nail head. The washers have a hole slightly larger in diameter, about 0.1 mm larger, than the diameter of the nail shank. The outer diameter of the nail head and the washer is from 0.5 to 2.5 mm larger than the diameter of the vent which they cover and preferably from 1.0 mm to 1.5 mm larger than the vent diameter. The diameter of the nail head can be smaller than the vent hole diameter, in which case the washer diameter must be larger than the vent hole diameter but this is not preferred. The larger the diameter of the nail head and washer, the larger the area for air exhaustion from the mold. The shank has a diameter of about 0.2 mm to 0.7 mm smaller than the vent in which it is placed. For example the vent holes generally range from a diameter of 1.2 mm to 2.2 mm in diameter. The nail shanks generally have a diameter of 0.9 mm to 1.7 mm. These values do not appear to be critical. The length of the shank also is not critical. The shank preferably is long enough that it can be inserted through the vent hole then the headless end bent over against the outer mold surface to lock the insert in the vent hole. Imperfection in the underside of the nail head causes a clearance of about 0.02 to 0.13 mm between the head of the nail and the mold surface.

If the shank of the washered nail is bent over to hold the washered nail in place, there still remains in most cases some slight movement of the shank along the length of the vent. This movement can be as much as 0.125 mm and can vary down to zero.

The amount of movement does not appear to be critical. If the washered nail is to be bent and driven into the vent hole, a shank length of from 12.7 mm to 50.8 mm is sufficient. A washered nail having a shank of from 14 to 20 cm is preferred. The washered nails used in Example I were of a commercial grade and had surface imperfections under the nail heads which held the nail heads away from the washers allowing air to discharge between both the nail head and washer and the washer and mold surface. By using the washered nail system a relatively large air discharge area can be provided while still retaining an opening having a small diameter. That is to say there is a lot of room around the circumference of the washered nail head and washer for air to exhaust but the spacings between the nail head and washer, and the washer and the mold surface are so small that uncured rubber cannot enter the spacings.

EXAMPLE I

This example involves one conventional tire mold used commercially to manufacture a size GR-78-14 radial tire. In the normal operation of the mold, about 10% of many of the tires produced had molded in plugs. The vents of the tire mold were conventional open vents. There are approximately 1000 vents in this mold. The vents have a 1.78 mm diameter, and range in depth from 2.5 cm to 10 cm. A cross section of the mold is shown in the drawing FIG. 1. The inner mold surface is shown at 2 and the metal inner surface of the vents at 4.

Figure 1:
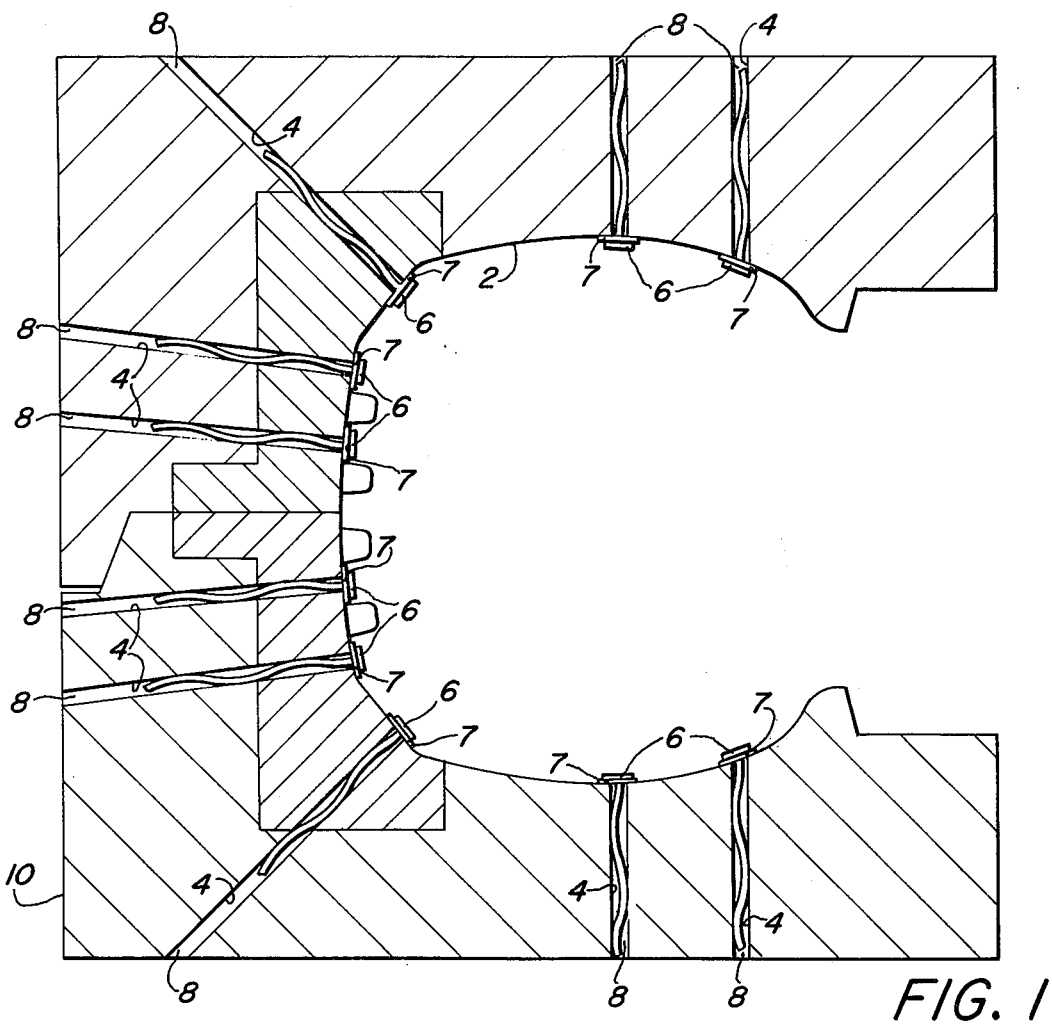
FIG. 1 is a side cross-sectional view of a tire mold having washered flat-headed nails inserted in the vents. The nails are crimped.
Figure 2:
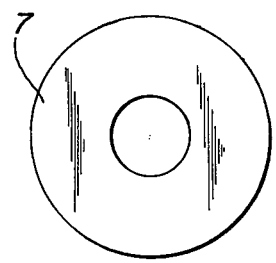
FIG. 2 is an enlarged top view of a conventional flat washer.

The mold was modified, according to the present invention, by inserting crimped nails 6 having washers 7 between the nail heads and the mold surface in each of the vents 8 of mold 10 (see FIG. 1). A typical washer is shown in FIG. 2. The washers used in all the examples were smooth surfaced stainless steel washers having an outside diameter of 6.7 mm, a hold diameter of 1.7 mm and a thickness of 0.16 mm. The nails used were common wire nails otherwise known as box nails. Such a nail before crimping and having a washer 13 applied is shown in FIG. 3. The head 12 is attached to pointed shank 14. The nails used had a shank length of 18 cm, a shank diameter of 1.5 mm and a head diameter of 3.6 mm. The head 12 was flat and had a thickness of 0.36 mm. The nails were made from steel. Before inserting the nails into the vents the nails were crimped. As shown in FIG. 4, shank 14 contains crimp 16. The crimped nail 6 does not slide easily into vent 8 and must be driven in. Once in the springing action of crimp 16 holds nail 6 in place.

EXAMPLE II

The nails of this example were made from aluminum which had a smoother finish than the steel nails and thus less likely to hold accumulated particles. The mold used was a 11 × 24.5 deep lug radial truck tire mold. The mold in the past had caused a lot of problems because of the rubber protrusion breaking off and falling into the bottom of the mold. In addition, rubber was flowing into the vents, and into an interface between the aluminum mold facing 11 and the steel housing 37 and curing there. The interface is shown at 5 of FIG. 1. Due to warpage and machinery problems, open voids (not shown) occurred between the aluminum mold facing 9 and the steel housing 11.

In normal operation the vents were conventional open vents. There are approximately 720 vents in this mold in its conventional state. The vents have a 2 mm hole diameter, and range in depth from 100 cm to 200 cm. The mold was of the type shown in the drawing FIG. 5. The inner mold surface is shown at 20 and the metal surface of the vents at 22.

Figure 6:
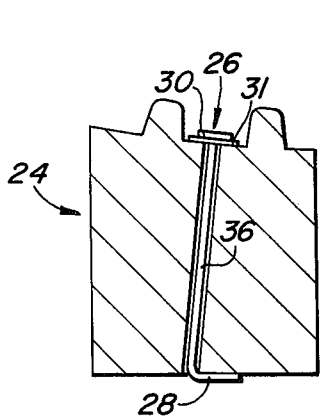
FIG. 6 is a cross-sectional view of one of the vents of the mold of FIG. 5 showing a washered nail in place.

The mold 24 was modified, according to the present invention, by inserting washered nails 26 in each of the approximately 300 tread vents which had caused problems in the past, or were in position which had caused problems in the past, and bending the shanks 28 of the nails against the back side of the mold surface to lock the nails in place. The nail heads 30 hold washers 31 against the inner mold surface 20. A typical vent having a washered nail insert is shown in FIG. 6. The washered nail before it is inserted and before it has its shank bent is shown in FIG. 7. Nails were not inserted into the shoulder vents 32 and the sidewall vents 34 because these vents did not result a serious problem of rubber plugs being molded into the sidewalls. The nails used had a length of 15.2 cm, a shank 36 diameter of 1.5 mm and a head 30 diameter of 3.6 mm. The head 30 was flat and had a thickness of 0.36 mm. The washers 13 used were identical to those of Example I. The nails were made from aluminum. Unlike ordinary nails they had no point.

Ten such molds were operated in the regular production of tires for 3 months, 24 hours per day, 6 days a week, with no plugging or other problems, due to venting. None of the tires produced had a problem with rubber plugs molded into the sidewalls.

EXAMPLE III

Figure 5:
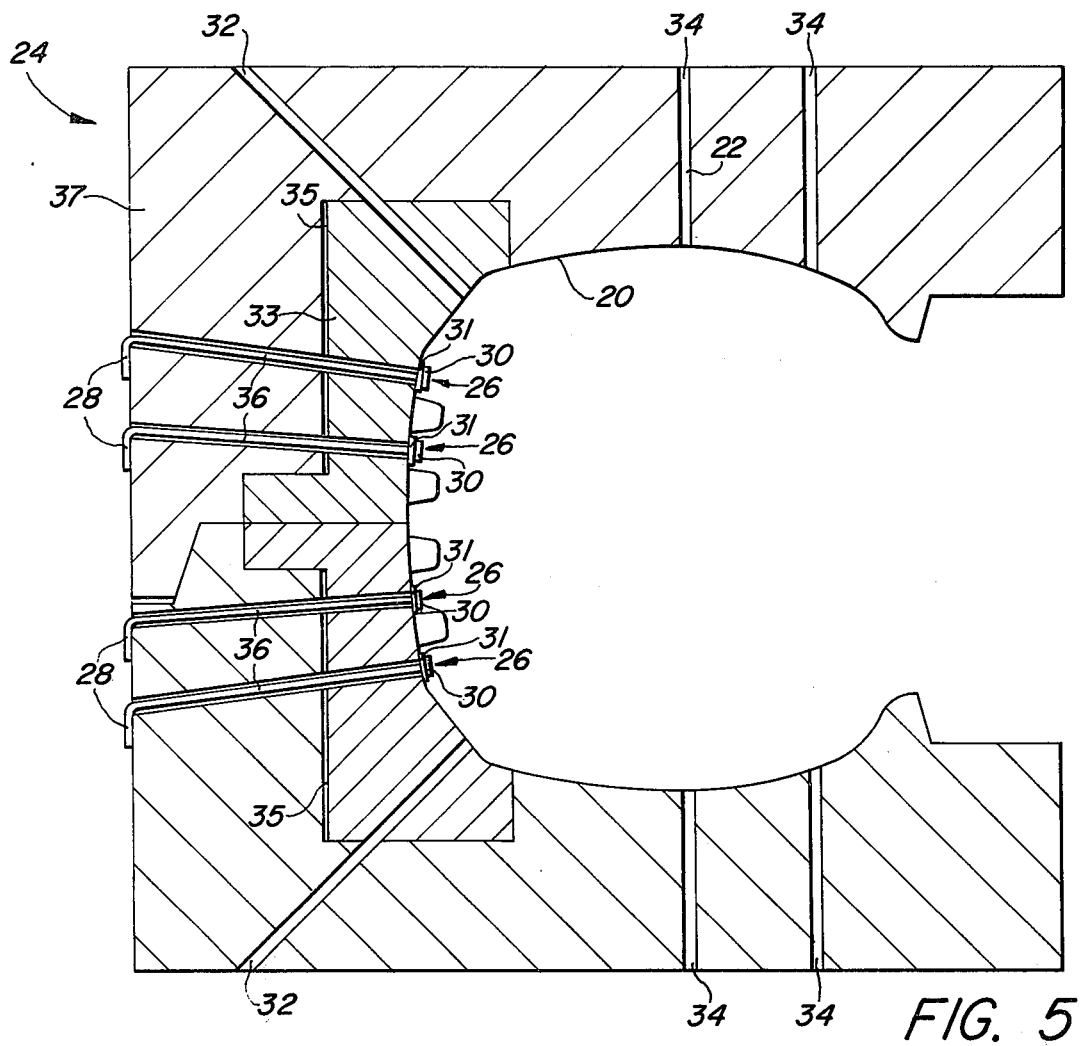
FIG. 5 is a cross-sectional view of a tire mold having washered flat headed nails inserted into the tread vents of a tire mold. The nails are held in place by bending the shanks against the exterior mold surface.
Figure 8:
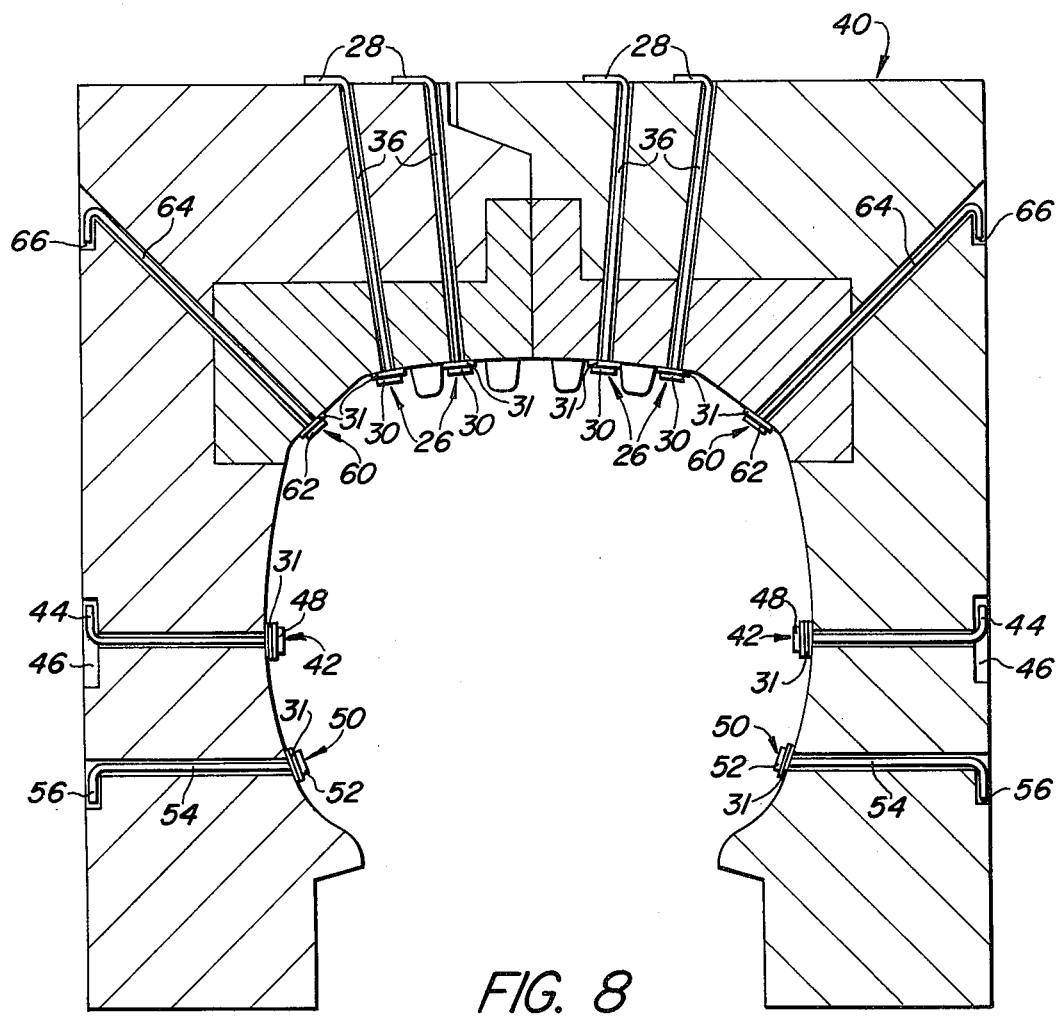
FIG. 8 is a cross-sectional view of a tire mold like that of FIG. 5 having washered nail inserts in shoulder and sidewall vents, and having recesses cut into the exterior mold sides so that the bent over nail shank will not protrude beyond the original mold surface.

In order to eliminate rubber protrusions from forming on sidewalls and shoulders of tires, the mold of FIG. 5 was redesigned to accommodate washered nails in both the shoulder vents and the sidewall vents. The redesigned mold is shown in FIG. 8. Insofar as the rib vents and washered nail inserts for the rib vents are concerned, they are the same as those of FIG. 5. The mold however is modified with respect to the sidewall vents and the shoulder vents. If the washered nails were inserted into the shoulder and sidewall vents of the mold of FIG. 5 and bent over against the outer surface of the mold, the protrusions would interface with placing the mold in a press. To overcome this problem, the side surfaces of the mold are recessed to accommodate the bent over shanks of the nails.

In the case of the sidewall vents where the washers under nail heads lie normally flat against the inner surface of the mold, the outer surface surrounding each of the mold vents is recessed in a circular manner to accommodate the bent over nail end. This feature is shown by washered nail 42 inserted through the sidewall of mold 40. Shank 44 is bent over into a circular recess 46 of the outer wall of mold 40. Head 48, perpendicular to shank 44 lines flat against the inner surface of mold 40. The circular recess is shown in a side view of the section of the mold containing the recess in FIG. 9. The recess is shown at 46 and the bent over washered nail shank at 44. The position of the washered nail head at the inner surface of the mold is indicated at 48.

When the washered nail is inserted through the sidewall of the mold and the shank bent so that the washered head is parallel to the inner mold wall, it is preferred that the shank be bent over into a linear recess. This prevents rotation of the shank and the resultant nonparallel positioning of the nail head with the washer and the inner wall of the mold. Such a washered nail insert is washered nail 50. Head 52 is hit with a hammer so that it will lie parallel to the inner surface of the mold. Shank 54 is bent over into linear recess 56. Two washers 31 are positioned under head 52. Nail heads 42 have three washers 31 under such nail head.

Figure 10:
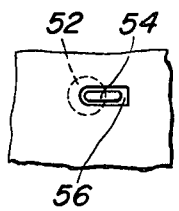
FIG. 10 is a view of a linear recess of FIG. 8.

A view of the part of mold 40 containing recess 56 is shown at FIG. 10.

Another situation in which it is preferred that the shank of the washered nail be bent over into a linear recess rather than a circular recess is where the vent hole is not perpendicular to the outer mold wall. This embodiment is shown in the shoulder vents. There washered nail 60 having head 62 parallel to the inner surface of the mold has its shank 64 bent over into linear recess 66. A side view of the section of the mold showing the linear recess is the same as FIG. 9.

Other embodiments which can be used include the washered nail of FIG. 11. The nail 60 of FIG. 11 has radial ridges 62 and 64 under nail head 66. These ridges are designed to space the nail head a distance of from 0.025 to 0.125 mm from the surface of washer 67 when shank 64 is inserted into a mold vent and bent over to hold the nail in place.

When the head of the washered nail insert must conform to the configuration of the inner surface of the mold, a washered nail with a square or other conforming shaped head and a washer to match is employed. Such a nail is shown in FIG. 12. There nail 70 has shank 72 square head 74 and square washer 73. Preferably when this type of nail is used a linear recess is used in the outside surface of the mold so that the head will not move out of conformity with the mold configuration which it is supposed to mate.

What is claimed is:

1. A tire mold for imparting a tread design into the surface of a tire while the tire is being cured, said tire mold having vents for the purpose of releasing air which would otherwise be trapped as the uncured rubber is forced into the tread design section of the mold, the improvement which comprises at least one nail having a shank inserted into a mold vent, the nail having a head, at least one washer positioned under the head of the nail, the head of each nail and the at least one washer being inside the mold cavity, each nail being secured into place so that each shank is movable along the length of the vent from zero to 0.125 mm.

2. The mold of claim 1 wherein the nails are held in place by a bend in the shank.

3. The mold of claim 2 wherein the nails are held in place by a bend in the shank at the mold exterior.

4. The mold of claim 2 wherein the nails are held in place by a bend in the shank at the area of the nail positioned within the vent.

5. The mold of claim 1 wherein the nail contains a protrusion under the nail head which holds the nail away from the interior mold surface.

6. The mold of claim 5 wherein the protrusion is from 0.025 to 0.125 mm in height.

* * * * *